July 8, 1969 G. M. BOOTH 3,454,854
INDUCTIVE TRANSDUCER WITH SERVO SYSTEM
Filed Oct. 2, 1967 Sheet 1 of 3
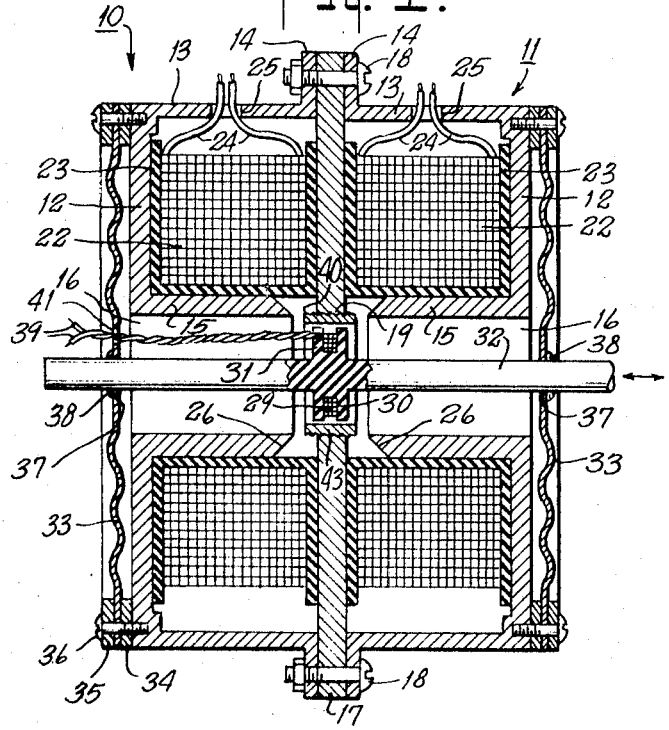
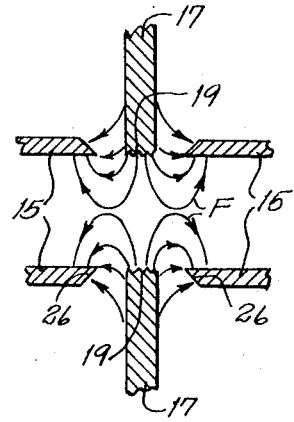
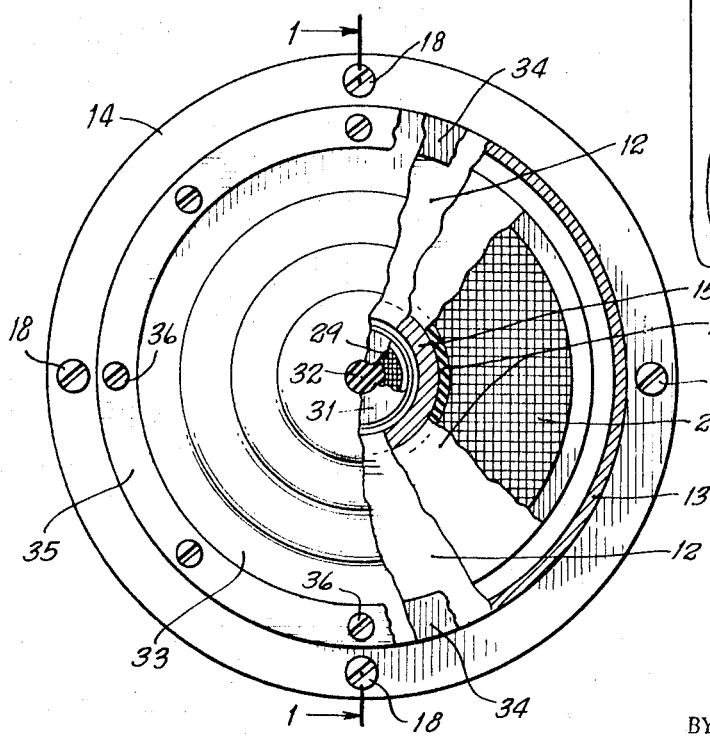
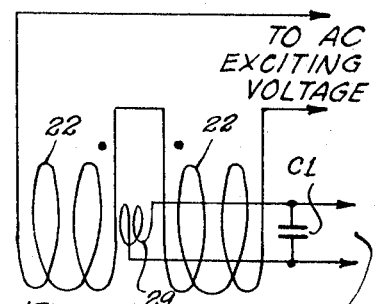
INVENTOR.
GEORGE M. BOOTH
BY
John A. Harvey
ATTORNEY

United States Patent Office 3,454,854
Patented July 8, 1969

3,454,854
INDUCTIVE TRANSDUCER WITH SERVO SYSTEM
George M. Booth, Jensen Beach, Fla., assignor to Wallace & Tiernan Inc., East Orange, N.J., a corporation of Delaware
Filed Oct. 2, 1967, Ser. No. 672,040
Int. Cl. G05b *11/06;* H02p *5/06;* H02k *17/30*
U.S. Cl. 318—18                                    8 Claims

ABSTRACT OF THE DISCLOSURE

The inductive transducer includes a pair of cylindrical cup-shaped members of magnetic soft iron material having cylindrical side walls terminating in a radial flange. Each member has a hollow, concentric, interior magnetic pole portion of cylindrical cross-section which is integral with the base of the member and terminates just short of the end plane of its flange. These members are coaxially positioned on opposite sides of, and are secured by their flange to, a plate member of magnetic soft iron material having a circular aperture concentric with the axis of the cup-shaped members and providing at the region of the aperture a magnetic pole positioned in coaxial spaced relation to the end of the pole portion of each cup-shaped member. A multi-turn primary winding is concentrically positioned within each cup-shaped member surrounding the pole portion thereof, and the windings are concurrently electrically energized with alternating current to produce opposing magnetic fields in the air gaps between the plate member and the ends of the pole portions. A secondary winding is supported in coaxial relation within the aperture of the plate member, as by means of a support rod of non-magnetic material extending through a concentric aperture in the base of at least one cup-shaped member, for displacement axially over a range of positions extending through and to either side of the aperture of the plate member. Any alternating voltage induced in the secondary winding has an amplitude and a phase, relative to the primary winding alternating current energization, which are indicative of the respective magnitude and sense of displacement of the secondary winding from the center of symmetry of the air-gap magnetic fields. Movement of the secondary produces an "error" input signal to a servo unit which utilizes the signal to develop and supply power to a motor. The motor in turn moves a carriage which flexes springs attached to the transducer thereby displacing the transducer magnetic structure in a direction and to such an extent as to reestablish the center of symmetry of the magnetic fields at the prevailing position to which the secondary winding has been moved.

---

The present invention relates to inductive transducers, and more particularly to such transducers generally of the differential transformer type wherein a pair of primary windings are energized to produce opposing magnetic fields and are differentially magnetically coupled to a secondary winding.

It is an object of the invention to provide a new and improved inductive transducer which provides an output alternating voltage exactly in phase with an input exciting voltage or exactly 180° phase displaced from such exciting voltage, and one which for optimized zero or null output voltage of fundamental excitation frequency is relatively free from any quadrature-phase or harmonic output voltage components.

It is an additional object of the invention to provide a novel inductive transducer having fixedly positioned primary windings differentially magnetically coupled to a relatively movable secondary winding and one in which for zero or null output voltage of the secondary winding there is no magnetic reactive force exerted on such secondary winding.

It is a further object of the invention to provide an improved inductive transducer characterized by improved energy transfer from its input primary winding to its output secondary winding in all positions of the latter other than the zero output or null position.

It is yet a further object of the invention to provide an inductive transducer of improved and relatively inexpensive yet sturdy construction characterized by essentially totally enclosed magnetic fields well shielded from the otherwise disturbing effect of any prevailing external magnetic field in which the transducer may be operated.

Other objects and advantages of the invention will appear as the detailed description thereof proceeds in the light of the drawings forming a part of this application, and in which:

FIG. 1 illustrates in elevational cross-sectional view, and FIG. 2 in partially cross-sectional end view, an inductive transducer embodying the present invention in a particular form;

FIG. 3 is an enlarged fragmentary cross-sectional view showing the configuratilons of two internal air-gap magnetic fields developed by the transducer and is used in conjunction with the FIG. 4 simplified electrical circuit diagram in explaining the operation of the transducer;

Figure 5:
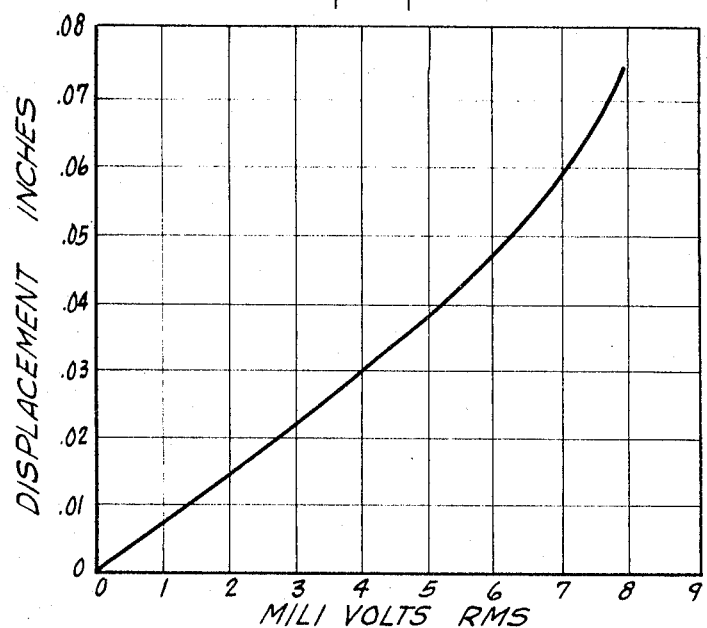
Figure 7:
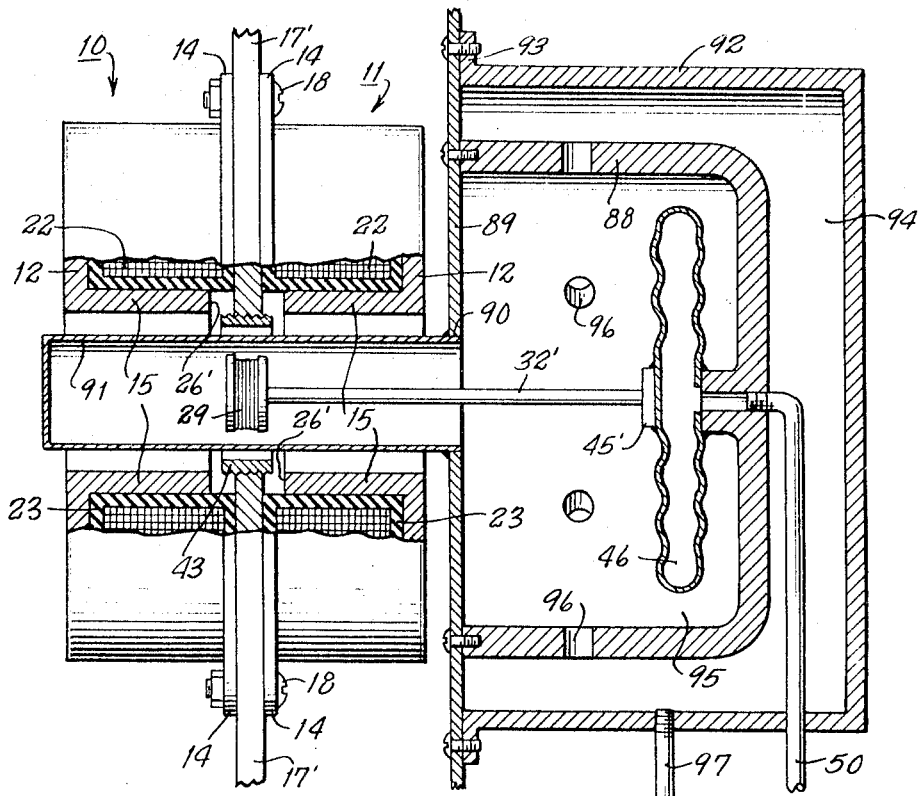
Figure 6:
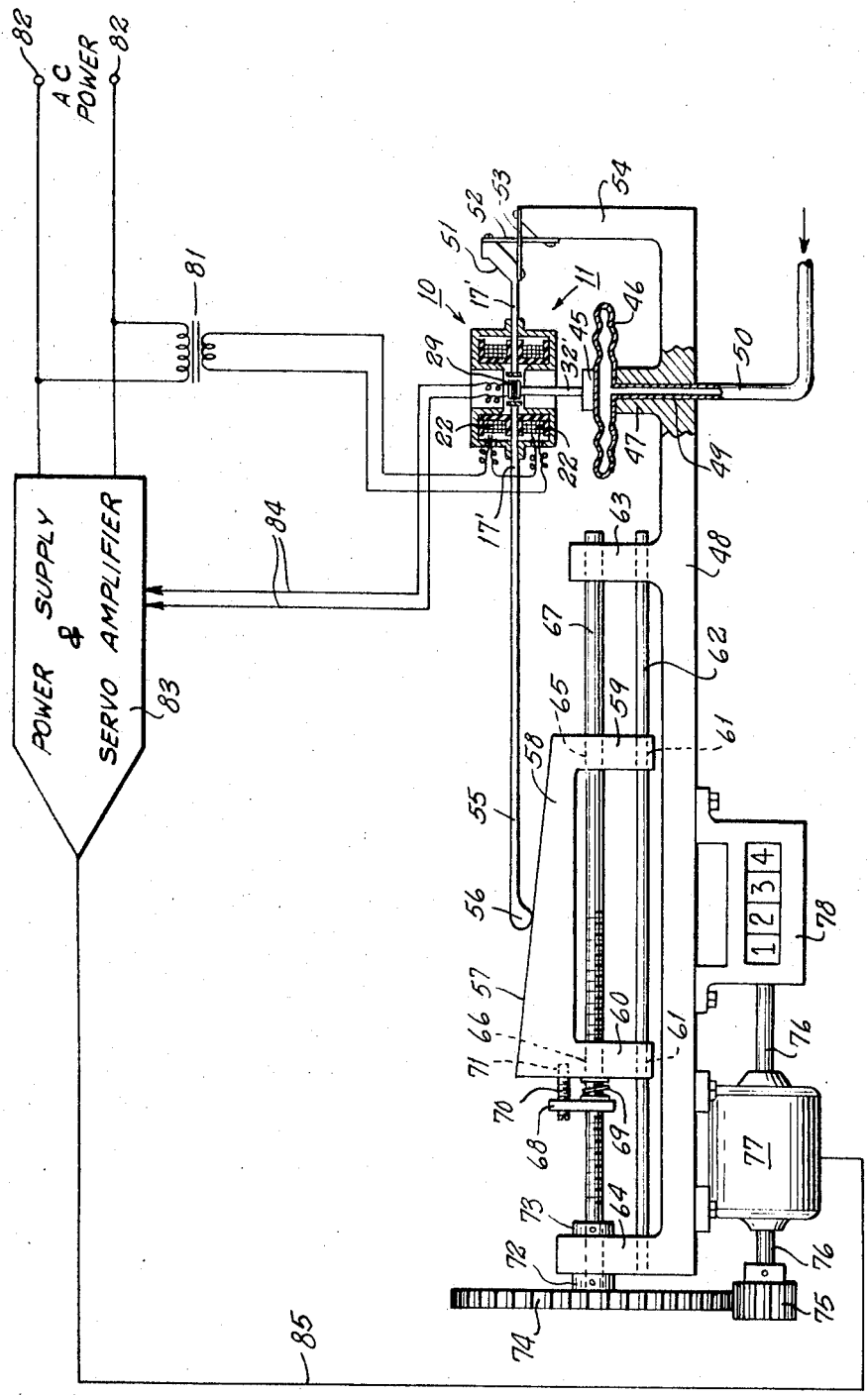

FIG. 5 graphically shows for a representative transducer embodying the invention its secondary winding output voltage with physical displacement of the secondary winding to one side of the center of symmetry of the air-gap magnetic fields produced internally of the transducer;

FIG. 6 illustrates a typical application of the inductive transducer of the invention in a representative electromechanical servo system used for indication of pressure supplied to an aneroid pressure sensitive capsule; and FIG. 7 illustrates, partly in cross-section, a representative application wherein an inductive transducer of the invention is employed in combination with an aneroid differential pressure capsule in a servo system of the FIG. 6 type.

Referring now more particularly to FIGS. 1 and 2 of the drawings, an inductive transducer embodying the invention includes a pair of cylindrical cup-shaped members 10 and 11. These members are fabricated of magnetic soft iron material and each has a base 12 and a cylindrical side wall 13 terminating opposite the base in a radial flange 14. Each member 10 and 11 also has a hollow, concentric, interior cylindrical magnetic pole portion 15 of soft iron fabricated integral with its base 12, preferably by machining the cup-shaped member with its pole portion from a solid piece of soft iron. The bore of each pole portion extends through the base to leave a concentric base aperture 16. Each of these pole portions 15 has an axial length less than that of the flanged side wall 13.

The cup-shaped members 10 and 11 are positioned coaxially in relation to each other on the opposite sides of a plate member 17 and are secured to the latter by circumferentially spaced fastening members, such as machine screws 18, extending through mating apertures in their flanges 14 and plate member 17. This provides a closed magnetic structure of coaxial assembly in which the plate member 17 extends the magnetic paths of the cup-shaped member 10 and 11 to provide, at the region of a coaxial circular aperture 19 of the plate members 17, a magnetic pole positioned in coaxial spaced relation to the end of the pole portion 15 of each such cup-shaped member 10 and 11.

A primary winding 22, fabricated of multiple turns of electrically insulated wire wound on a bobbin 23 of electrical insulating material, is positioned within each of the cup-shaped members 10 and 11 in surrounding relation to and for support upon the associated pole portion 15. The leads 24 of each of these windings extend externally of the transducer through an aperture 25 provided in the wall of each cup-shaped member 10 and 11. Each pole portion 15 may have its inner end terminating in a knife-edge nose portion 26 slightly to increase the concentration of magnetic flux within the end bore of the pole portion, the surface of the knife-edge nose portion lying on the surface of the knife-edge nose portion lying on the surface of a cone having its apex at a point on the axis of the pole portion and spaced beyond the inner end thereof. The primary windings 22 are concurrently energized with alternating current and are so wound or electrically connected as to provide longitudinally of each of the pole portions 15, and in the air gap between the end of the latter and the centrally apertured portion of the plate member 17, an alternating magnetic field having in one pole portion a magnetic field polarity opposite to that in the other pole portion. These air-gap magnetic fields, generally illustrated by the enlarged fragmentary view of FIG. 3, are symmetrically positioned on opposite sides of the median plane of the plate member 17 and have similar axially convolute magnetic field configurations as diagramatically indicated in FIG. 3 by the flux lines F having arrow heads to indicate magnetic polarity during one half cycle of energization of the windings 22.

The transducer includes a secondary winding 29 fabricated of multiple turns of electrically insulated wire wound in a concentric groove 30 provided in a radially flanged bobbin portion 31 of a secondary winding support rod 32 of electrical insulating material. The support rod 32 movably supports the secondary winding 29 in coaxial relation within the aperture 19 of the plate member 17 for displacement axially over a range of positions extending through and to either side of the aperture 19. To this end, each of the cup-shaped members 10 and 11 may include a concentrically apertured end diaphragm 33 of thin pliable sheet material spaced from the base of the cup-shaped member by a ring 34 and which is secured in position on the cup-shaped member by a clamping ring 35 and peripherally spaced machine screws 36 as shown. Each diaphragm 33 has a central coaxial aperture 37 through which the support rod 32 extends, the latter being secured to the diaphragms 33 as by a joining ring of cement 38. The end leads 39 of the secondary winding 29 extend through and are secured in a short radial slot 40 provided in a flange of the bobbin portion 31 and extend externally of the transducer through an aperture 41 provided in one of the diaphragms 33 as shown.

Considering now the operation of the inductive transducer just described, it will be evident that no output voltage is induced in the secondary winding 29 when the median plane of the latter is positioned in the planar center of symmetry of the air-gap magnetic fields produced between the ends of the pole portions 15 and the plate member 17 by alternating current excitation of the primary windings 22. That is, at any given time, as much magnetic flux passes through the secondary winding 29 in one direction and from one air-gap field as in the other direction and from the other air-gap field so that any induced voltages are canceled internally of the winding 29. As the secondary winding 29 is moved by the support rod 32 axially either way from the center of symmetry of the magnetic fields, however, the voltage inducing effect of the half of the double magnetic field into which it is moved exceeds the voltage inducing effect of the other half of the magnetic field from which it is moved. The net result is an instantaneous value of induced voltage in the secondary winding 29 which is 90° out of phase with the instantaneous value of current amplitude in that one of the primary windings 22 which produces the air-gap magnetic field into which the secondary winding 29 is moved. The 90° phase displacement results from the fact that the induced voltage in the secondary winding 29 is highest coincident with the maximum current change in the primary winding concerned, which current change is 90° out of phase with the current magnitude.

In those applications of the transducer where the phase relationship between the primary and secondary voltages is of no consequence, no phase correction need be considered. Where it is desired to have the induced voltage of the secondary winding 29 neither lag nor lead the primary voltage, however, the winding inductances must be considered. In such event, the primary windings 22 are wound with sufficient turns that the turns in combination with the magnetic characteristics of the soft iron members 10, 11 and soft iron plate member 17 provide sufficient primary winding inductance as to make the primary winding current lag the exciting primary winding voltage by an appreciable amount. Thus in particular applications, various transducers have been so constructed that the primary winding current lagged the primary winding exciting voltage by 50° to 65°. This lag when added to the 90° lag of the voltage induced in the secondary winding 29 as just previously mentioned adds to a total lag of 140° to 155°. In order to provide a further lag of 25° to 40° to the secondary winding voltage required to place it in phase (or 180° out of phase) with the primary winding voltage, a condenser C1 is connected in shunt to the secondary winding 29 as indicated by the simplified schematic electrical circuit of the transducer represented by FIG. 4 and with the size of the condenser C1 so selected as to produce the desired additional lag. It is evident that where it is desired to have the secondary winding voltage at some other phase relationship to the primary winding exciting voltage, the design of the several winding inductance values and the selection of associated capacitance values in conventional manner is readily effected to attain the desired phase relationship.

An important advantage of an inductive transducer embodying the invention arises from the use of an essentially closed iron magnetic path which allows the attainment of an appreciable current lag in the primary winding in relation to the primary winding exciting voltage and thus permits the use of very little and very simply effected phase adjustment in the secondary winding. A further important advantage of the present transducer construction with its essentially closed primary magnetic path is that the leakage flux, which alone induces a voltage in the secondary winding, is concentrated at the air gaps adjacent to the secondary winding. By this construction the efficiency of energy transfer from the primary windings to the secondary winding is greatly improved over that heretofore attainable with prior art differential transformers of conventional construction. A further advantage of the present transducer construction is that the structure inherently provides essentially totally enclosed magnetic fields, and thus the internal windings are well shielded from the otherwise disturbing effect of any prevailing external magnetic fields in which the transducer may be operated.

The use of a non-metallic, non-conductive material for the support rod 32 eliminates the possibility of creating any eddy currents in the support rod and thus the creation of any magnetic force acting thereon. The absence of any magnetic material in the support rod 32 likewise eliminates any possibility of any magnetic force acting on the support rod. The fact that no voltage or current is produced in the secondary winding 29 when the median plane of the latter is positioned in the center of symmetry of the air-gap magnetic fields (i.e., the null position) also eliminates any reactive force acting on the support rod 32, which is an important advantage of the present inductive transducer construction where the support rod 32 is to be positioned by an analogue mechanical structure the position of which might be undesirably influenced by such force. An example of this is one wherein an aneroid pressure sensitive capsule effects positioning of the support rod 32 as in a typical application of the invention hereinafter described It has been found in practice that when the median plane of the secondary winding 29 is positioned at the center of symmetry of the air-gap magnetic fields produced between the ends of the pole portions 15 and the plate member 17, the output voltage of the secondary winding 29 has zero value for the fundamental frequency of excitation of the primary windings 22 and is entirely free of either quadrature related components or harmonic components of the primary winding exciting voltage. Both such output quadrature related components and harmonic components are produced by conventional prior art differential transformers at null, and have such large amplitudes that some external circuitry is conventionally required either to cancel out or to filter out such unwanted non-intelligence carrying "noise" components. This is especially true in those applications where extreme sensitivity is an important and desirable characteristic in the particular application using such conventional differential transformers.

In practice, it is difficult to fabricate the primary windings 22 or the cup-shaped members 10 and 11 absolutely identical so that the air-gap magnetic fields produced between the ends of the pole portions 15 and the plate member 17 may not be entirely symmetrical with one another in respect to the medium plane of the latter. Thus in the case of the primary windings 22, it is relatively easy to provide them with the correct number of turns so that when they are connected in series with one another they each produce identical ampere-turns of flux. Variations in geometry of the iron paths and air gaps may be readily compensated for by making one or both of the air gaps adjustable. A preferred construction for attaining symmetrical matching of the magnetic fields at the air gaps between the ends of the pole portions 15 and the plate member 17 is that illustarted in the FIGS. 1 and 2 wherein the concentric aperture 19 of the plate member 17 is internally threaded and receives an externally threaded closed-ring metal sleeve 43 which is preferably fabricated of non-magnetic conductive material but may be fabricated of magnetic material. This sleeve is adapted to be rotationally threaded into the aperture 19 so as to extend further into one or the other of the air gaps and thus attain the desired symmetry of the air-gap fields in relation to the median plane of the plate member 17. Such rotational adjustment of the ring 43 may be accomplished, during assembly of the transducer or thereafter if it omits one or both of the rod-support diaphragms 33 as hereinafter described, in any of several manners such as by use of a hollow sleeve having end nibs which may be inserted into radial slots (not shown) of the ring 43 and by which axially to adjust the position of the latter as desired to produce in the secondary winding 29 a true null voltage free of quadrature components or harmonic-frequency components.

In an illustrative inductive transducer embodying the invention, the cup-shaped members 10 and 11 and the plate member 17 were fabricated of soft iron having a 49% nickel content, each primary winding 22 was wound with 6000 turns of No. 40 enameled copper wire, the secondary winding 29 was wound with 500 turns of No. 40 enameled copperwire, and a condenser of 56 microfarads was connected in shunt to the secondary winding 29 to effect adjustment of the induced secondary voltage of the winding 29 to be within a degree or two of either an exact in-phase or exact 180° out-of-phase relation with the primary winding excitation voltage. In the transducer so constructed, and with the primary windings 22 connected in series with one another and excited with a primary voltage of 16 volts R.M.S. amplitude and 60 cycle frequency, the induced secondary voltage of the secondary winding 29 was approximately 0.2 R.M.S. millivolt for each 1/1000 inch of its displacement to either side of the center of symmetry (or null position) of the air-gap magnetic fields produced between the ends of the pole portions 15 and the plate member 17. This value of secondary voltage corresponds to approximately 0.6 R.M.S. microvolt per each 3/1,000,000 inch displacement of the secondary winding from the null position. FIG. 5 graphically represents the relationship between the voltage induced in the secondary winding 29 and the displacement of the latter to one side of the null position, established by the center of symmetry of the magnetic fields developed in the air gaps at the ends of the pole portions 15, as measured in a typical inductive transducer construction embodying the present invention. It will be evident that the amplitude of the induced output secondary winding voltage varies substantially linearly with displacement of the secondary winding from the null position over a substantial range of displacements. Displacements of the secondary winding in the opposite direction from the null position result in a similar voltage-amplitude characteristic to that represented by FIG. 5 but with the differences that the voltage induced in the secondary winding for one direction of displacement has opposite phase to the induced voltage effected by displacements of the secondary winding in opposite direction.

FIG. 6 illustrates a typical application of the inductive transducer of FIGS. 1 and 2 in a representative electromechanical servo system used for indication of pressure supplied to an aneroid pressure sensitive capsule. Components of the inductive transducer construction shown in FIG. 6 which correspond to the same components of FIGS. 1 and 2 are designated by similar reference numerals and analogous components by similar reference numerals primed. In the FIG. 6 arrangement, the end diaphragms 33 used in the FIG. 1 construction for the secondary winding support rod 32 are omitted and the secondary winding 29 is movably supported on a support rod 32' directly affixed by a collar 45 to an aneroid pressure sensitive capsule 46. The capsule 46 forms a component of a linear-to-pivotal motion translating structure here only schematically illustrated but disclosed more fully and claimed in a copending application of William De Mair et al., Ser. No. 672,322, filed concurrently herewith on Oct. 2, 1967, and assigned to the same assignee as the present application. The capsule 46 is supported on a stud 47 formed on a base casting member 48 having an orifice 49 extending through the stud 47 by which a gas or fluid under pressure is supplied through a pipe 50 to the interior of the capsule 46. The plate member 17' of the transducer is extended to an angled end portion 51 which is pivotally secured by spaced pairs of flat spring cross-flexure members 52 and 53 having their ends secured as shown to an upstanding flange 54 of a base member 48. The opposite end of the plate member 17' has an integral extending arm 55 terminating in a smoothly contoured cam follower portion 56 which engages a cam surface 57 provided on a U-shaped carriage 58. The depending arms 59 and 60 of the carriage 58 have coaxially aligned and smooth-bored guide apertures 61 for guided support upon a rod 62 extending between and secured to upstanding flanges 63 an 64 of the base member 48. The depending arm 59 also has a smooth-bored aperture 65 coaxially aligned with an internally screw-threaded aperture 66 for reciprocal driven support upon a shaft 67 rotationally journaled at its opposite ends in the flames 63 and 64, The right-hand end of the shaft 67 is smooth surfaced for sliding engagement wtih the aperture 65 of the carriage 58, and its left-hand end is screw-threaded as shown for threaded engagement with the aperture 66 of the carriage. A conventional lost-motion take-up nut 68 is threaded onto the shaft 67 to compress a helical wire spring 69 and is retained against rotation by a stud 70 seated in a screw-threaded aperture 71 of the carriage 58. The shaft 67 is secured against longitudinal displacement by collars 72 and 73 positioned on opposite sides of the base member flange 64 and secured to the shaft in any convenient manner such as by use of pins or set screws. Affixed to the end of the shaft 67 is a driven ring gear 74 having meshing engagement with a pinion gear 75 secured on one end of the shaft 76 of a drive motor 77. The opposite end of the motor shaft 76 is mechanically connected to operate a digital counter 78 secured as shown to the base member 48.

The primary windings 22 of the transducer are serially connected with opposing magnetic polarities in the manner indicated by the polarity dots of FIG. 4, and are energized through a transformer 81 from a source of alternating current power supplied to energizing terminals 82. This alternating current power also energizes a power supply and servo amplifier unit 83 more fully disclosed and claimed in applicant's copending application Ser. No. 672,225, filed concurrenlty herewith on Oct. 2, 1967, and assigned to the same assignee as the present application. The induced voltage of the transducer secondary winding 29 is supplied through conductors 84 as an "error" input signal to the unit 83. As the pressure of the gas or liquid supplied through the pipe 50 to the capsule 46 changes, the caspule 46 effects a corresponding displacement of the secondary pickup winding 29 to one side or the other of the null position or position of symmetry of the magnetic fields produced in the air gaps at the ends of the transducer pole portions 15. For reasons explained above, a resultant secondary output voltage is induced in the secondary winding 29 of the transducer with an amplitude varying with the magnitude of displacement of the secondary winding from the null position and with a phase dependent upon the direction of secondary winding displacement from the null position. This induced voltage is supplied as an "error" signal through the conductors 84 to the unit 83, which utilizes the signal to develop and supply to the motor 77 through an output circuit 85 energizing power which causes the motor 77 to rotate in one direction or the other dependent upon the phase of the output voltage developed in the secondary winding 29. The motor 77 thereupon drivingly rotates the shaft 67 through the gears 74 and 75, and this rotational drive of the shaft 67 linearly displaces the carriage 58 longitudinally of the shaft 67. The cam surface 57 of the carriage thereupon operates through the cam follower arm 55 to pivot the transducer magnetic structure about a frictionless immobile axis of flexure of the cross flexure springs 52 and 53, thereby displacing the transducer magnetic structure in a direction and to such extent as to reestablish the center of symmetry of its magnetic fields at the prevailing position to which the secondary winding 29 has been moved by the capsule 46. This repositioning of the transducer magnetic structure reduces to zero value the induced voltage of the secondary winding 29, whereupon the energization of the motor 77 by the servo unit 83 ceases to halt further pivotal displacement of the transducer magnetic structure. The position to which the transducer magnetic structure has thus been moved in following the positioning of the secondary winding 29 by the capsule 46 is digitally indicated by the digital indicator 78. The system remains at rest until the position of the secondary winding 29 is again changed by the capsule 46 in response to a change of fluid pressure.

FIG. 7 illustrates, partially in cross-section, a representative application similar to that just described but in which the inductive transducer of the invention is used in combination with an aneroid differential pressure capsule. The inductive transducer is here shown by way of example as having pole portions 15 with blunt-end nose portions 26' and, as in the arrangement of FIG. 6, the transducer secondary winding 29 is movably supported upon a rod 32' threaded into a nut 45' secured to an aneroid pressure sensitive capsule 46. The latter is shown as supported by a cup-shaped housing 88 secured to a mounting plate 89 which is supported by means not shown from the base member 48 of the linear-to-pivotal motion translation structure of FIG. 6. The plate 89 is provided with a concentric aperture 90 in which there is inserted and secured by an hermetic seal an hermetically closed cylindrical housing 91 positioned concentric with the axis of the transducer structure and extending longitudinally therethrough as shown. The housing 91 is fabricated of any conventional material having non-magnetic properties combined with high electrical resistivity such as, for example, Hastelloy Alloy C marketed by the Haynes Stellite Company of Kokomo, Ind. These electrical properties of the material of the housing 91 result in the housing having little or no significant effect on the phase or amplitude of the voltage induced in the transducer secondary winding 29 positioned interiorly thereof as shown. The cup-shaped housing 88 is enclosed within a further cup-shaped housing 92 having a peripheral end fiange 93 hermetically secured to the mounting plate 89 to provide an interior chamber 94 which communicates with an interior chamber 95 of the housing 88 through apertures 96 provided in the side walls of the latter. The pressure sensitive capsule 46 is supplied through the pipe 50 with pressurized gas or vapor, and the chamber 94 is similarly supplied through a pipe 97 with a gas or vapor having a differential pressure to that supplied to the capsule 46 through pipe 50. The capsule 46 thus responds to the differential of its interior and exterior gas or vapor pressures axially to position the transducer secondary winding 29 according to the prevailing value of the differential pressures. The structure just described thus may be used in a follow-up indicator system of the FIG. 6 type to provide indications of differential gas or vapor pressures.

It will be apparent from the foregoing description that an inductive transducer embodying the invention is one having fixedly positioned primary windings differentially magnetically coupled with improved energy transfer to a relatively movable secondary winding in which, for zero or null output voltage of the secondary winding at fundamental frequency, there is an absence of quadrature-phase or harmonic components in its output voltage and on significant magnetic reactive force exerted on the secondary winding. An inductive transducer embodying the invention has the further advantage that it possesses an improved and relatively inexpensive yet sturdy construction characterized by essentially totally enclosed magnetic fields well shielded from the otherwise disturbing effects of any prevailing external magnetic fields in which the transducer may be operated.

While there have been described specific forms of the invention for purposes of illustration, it is contemplated that numerous changes may be made without departing from the spirit of the invention.

I claim:

1. Position responsive inductive transducer apparatus, comprising:
 (a) primary winding means;
 (b) secondary winding means;
 (c) movable means supporting the secondary winding means for relative movement with respect to the primary winding means; and
 (d) magnetic circuit means defining a path for magnetic flux produced by the primary winding means; wherein the improvement comprises:
 (e) said magnetic circuit means, including:
  (1) two cup-shaped members of magnetic material, each comprising an annular base, an outer wall extending transversely from the outer periphery of the base, and a hollow, central, interior pole extending parallel to the wall from the inner periphery of the base in the same direction as the wall, said pole being slightly shorter than the wall;
  (2) a plate member having an aperture substantially equal in cross-sectional area to the cross-sectional areas of the apertures defined by said hollow poles, said plate member extending transversely beyond the walls of the cup-shaped members;
(f) means securing the walls of said cup-shaped members to the opposite sides of the plate member with the poles aligned with the plate member aperture, so that the cup-shaped members and the plate member cooperate to define a pair of cylindrical annular magnetic circuits, each substantially closed except for a short air gap at the end of its interior pole;
(g) said primary winding means comprising a pair of coils located respectively within said closed magnetic circuits and connected to a source of alternating electrical energy so as to produce opposing magnetic fluxes in said poles, said fluxes passing in the same direction through said plate;
(h) said movable means supporting the secondary winding means within said aligned apertures for longitudinal movement through a range of positions on either side of a neutral position wherein the opposing magnetic fluxes link the secondary winding means equally;
(i) said opposing magnetic fluxes being effective to induce in said secondary winding means electromotive forces of opposite phase, said electromotive forces being equal and opposite when said secondary winding means is in said neutral position, and being unbalanced in one sense or the other upon movement of said secondary winding means away from said neutral position, depending upon the direction of that movement;
(j) said substantially closed magnetic circuits being effective to shield said secondary winding means from external magnetic fields, and to inhibit the induction of harmonic frequency electromotive forces in said secondary winding means.

2. Position responsive inductive transducer apparatus according to claim 1 wherein: (a) the outer wall of each said cup-shaped member terminates in a radial flange; and (b) said securing means connects said radial flanges to the opposite sides of said plate member.

3. Apparatus as defined in claim 1, including means for adjusting said neutral position with respect to said plate member, said adjusting means comprising an externally threaded sleeve of electrically conductive material, threadedly engaging the inside of the aperture in the plate member, and rotatable therein to adjust its position in said aperture.

4. Apparatus as defined in claim 3, wherein said sleeve is of magnetic material.

5. Apparatus as defined in claim 1, including:

(a) second movable means supporting the plate member;
(b) means responsive to a variable condition for moving one of said movable means;
(c) reversible motor means for driving the other movable means in response to a signal at the terminals of the secondary winding means in a direction determined by the phase of the signal, to restore the secondary winding means to said neutral position.

6. Apparatus as defined in claim 5 in which:
(a) said movable means for supporting said plate member comprises:
(1) crossed spring pivot means supporting the plate member at a first point spaced from the cup-shaped members;
(2) cam follower means supporting the plate member at a second point, also spaced from the cup-shaped members;
(b) said condition responsive means positions the movable means supporting the secondary winding means; and
(c) said motor means drives a cam for positioning said cam follower means.

7. Position responsive inductive transducer as defined in claim 1, wherein said secondary winding means is shunted by a capacitance whereby the voltage lag between the primary and secondary windings is set to a predetermined value.

8. Position responsive inductive transducer apparatus, as defined in claim 1, wherein each pole is of generally cylindrical configuration and the pole end opposite its associated base terminates in a knife-edge nose portion with the sharp edge on the inner surface of the pole.

References Cited

UNITED STATES PATENTS

| 2,494,579 | 1/1950 | Pimlott et al. | 336—83 XR |
| 2,586,010 | 2/1952 | Divoll | 336—129 |
| 2,839,733 | 6/1958 | Bassett | 336—30 |
| 3,092,995 | 6/1963 | Glerum. | |
| 3,153,935 | 10/1964 | Karlson | 336—129 XR |
| 3,213,395 | 10/1965 | Glerum | 336—30 |

LEWIS H. MYERS, *Primary Examiner.*

T. J. KOZMA, *Assistant Examiner.*

U.S. Cl. X.R.

318—32; 336—30, 83, 119